Figure 1:
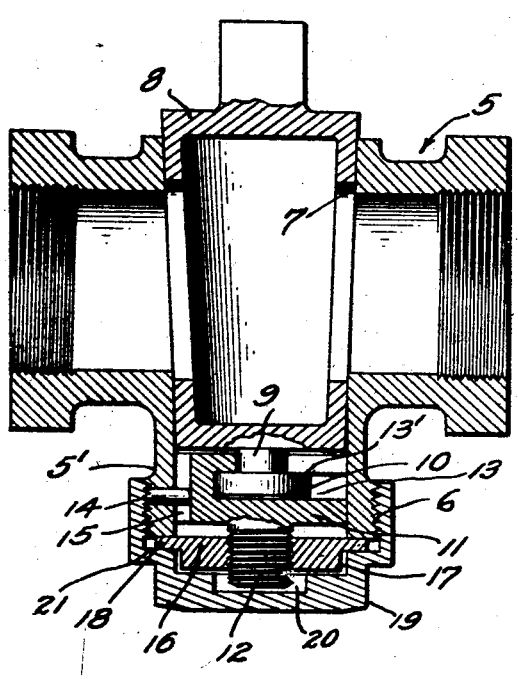

Dec. 8, 1925.

H. L. HARBAUGH 1,564,846

VALVE

Filed May 4, 1925

INVENTOR:
Harvey L. Harbaugh
BY
Pierre Barnes
ATTORNEY

Patented Dec. 8, 1925.

1,564,846

UNITED STATES PATENT OFFICE.

HARVEY L. HARBAUGH, OF SEATTLE, WASHINGTON, ASSIGNOR OF ONE-HALF TO FRANK HARWOOD, OF SEATTLE, WASHINGTON.

VALVE.

Application filed May 4, 1925. Serial No. 27,686.

*To all whom it may concern:*

Be it known that I, HARVEY L. HARBAUGH, a citizen of the United States, residing at Seattle, in the county of King and State of Washington, have invented certain new and useful Improvements in Valves, of which the following is a specification.

This invention relates to valves and more especially to valves of the type illustrated and described in U. S. Patent No. 1,316,302, issued September 22, 1919.

The object of the present invention is the perfecting of the valve regulating means to render the same more efficient and reliable. More specific objects and advantages of my improvements will appear in the following description.

The invention consists in the novel construction, adaptation and combination of parts hereinafter described and particularly pointed out in the appended claims.

In the drawing,—

Figure 3:
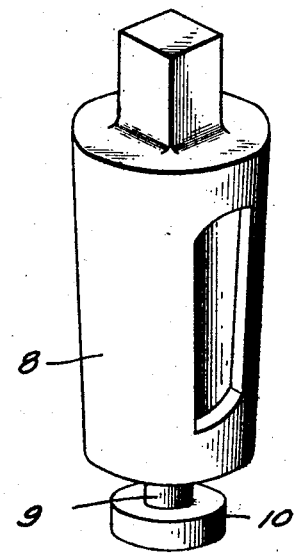
Figure 2:
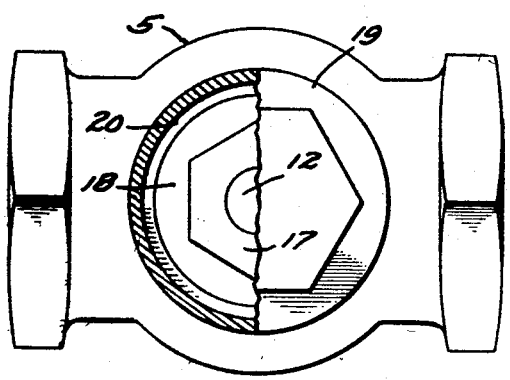

Figure 1 is a longitudinal vertical section of a valve with the present invention applied thereto. Fig. 2 is an underside plan view of the valve body, with a portion of the cap nut broken away and shown partly in horizontal section. Fig. 3 is a perspective view of the valve cock shown detached; and Fig. 4 is a similar view of the regulating member.

In said drawing, 5 represents a valve casing having at its underside a boss element $5^1$ which is externally screw threaded as at 6. Extending vertically through said casing axially of the boss 6 is a bore having a conical upper portion 7 for a similarly shaped plug or cock 8. Said cock is provided at its smaller end with an extension having a neck 9 which terminates in a head 10 of greater diameter than the neck. Associated with the cock is a holding member therefor, hereinafter designated as the regulator, comprising a body portion 11, preferably of a cylindrical shape, and a screw threaded stud 12 extending axially therefrom.

Figure 4:
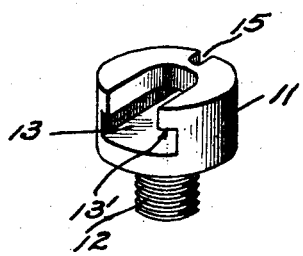

To accommodate said cock extension the regulator body 11 is provided with a slot 13 of substantially the shape of an inverted letter T which extends radially from the central portion of the body 11 to its periphery as best shown in Fig. 4.

When assembled the head 10 is located within the regulator slot to engage against the shoulders $13^1$. Rigid with the casing and extending into the lower portion of its bore is a pin 14, or an equivalent, which engages within a peripheral way 15 of body 11 to prevent the regulator turning, yet permitting its longitudinal movement. Engageable with the screw threads of the regulator stud 12 is an adjusting nut 16 having a wrench engageable portion 17, preferably polygonal, and a circumferential flange 18 which is adapted to bear against the extremity of the casing boss 6 when the nut is suitably turned upon the stud 12 to effect seating movement of the cock.

Included in the invention is a cap nut 19 having internal screw threads to engage the threads 6 of the casing boss $5^1$. The cap nut 19 is formed interiorly to provide a chamber 20 to accommodate the nut 16 and the end of the stud 12 which may protrude from the nut. As shown in Fig. 1 said chamber is arranged to provide an annular shoulder 21 to engage against the nut 16, preferably against the flange 18, for the purpose of clamping the adjusting nut between the cap nut 19 and the outer end of the casing boss $5^1$.

In practice the screw threads 6 of the casing boss should be of greater pitch than those of the regulator stud to facilitate the securement of the nut 16 in its valve adjusting position. The cock 8 and regulator are coupled with each other and thus inserted in the casing bore. The regulator stud is then engaged by the nut 16 which is then rotated in a manner to cause the regulator to draw the cock onto its seat in the casing bore. When the cock is thus adjusted the cap nut 19 is applied as shown.

What I claim is,—

1. In combination, a valve casing having an externally screw threaded boss, said casing being provided with a conical bore, a cock for said bore, a regulator comprising a slotted head element and a screw threaded stud element, means provided on the cock and engageable in the slot of said head for connecting the cock to the regulator for relative rotary movement, means provided in the casing to prevent rotary movement of the regulator and permitting axial movement of the same, a nut engaging the screw threads of the regulator stud, and a cap nut engageable with the threads of said boss for clamping the first named nut between the cap nut and the outer extremity of the casing boss.

2. In a valve of the character described, the combination with the casing, the cock, a regulator connected to the cock for relative rotary movement, said regulator being provided with a screw threaded stud element, a nut for said regulator stud, and means connected to said casing for clamping the nut thereto in an adjusted rotary position.

3. In a valve of the character described, the combination with the valve casing having a conical bore, a cock fitting in said bore and provided at its small end with an extremity comprising a head connected to the cock proper by a relatively small neck, a regulator provided with a body portion and a screw threaded stud, said body portion having a slot to accommodate the head and neck portions of the cock extension, and a nut for engaging said stud, of a cap adapted to be secured to the outside of the valve casing, said cap being provided with a cavity to receive said nut.

Signed at Seattle, Washington, this 26th day of March 1925.

HARVEY L. HARBAUGH.